(12) United States Patent
Sodagar (10) Patent No.: US 12,537,867 B2
(45) Date of Patent: Jan. 27, 2026

(54) METHOD AND APPARATUS FOR DYNAMIC POLICY SELECTION FOR MEDIA UPLINK STREAMING IN 5G MEDIA STREAMING NETWORKS

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/651,973

(22) Filed: May 1, 2024

(65) Prior Publication Data

US 2024/0388618 A1    Nov. 21, 2024

Related U.S. Application Data

(60) Provisional application No. 63/466,615, filed on May 15, 2023.

(51) Int. Cl.
| | |
|---|---|
| *G06F 13/00* | (2006.01) |
| *H04L 65/1069* | (2022.01) |
| *H04L 65/61* | (2022.01) |
| *H04L 65/80* | (2022.01) |

(52) U.S. Cl.
CPC .......... *H04L 65/80* (2013.01); *H04L 65/1069* (2013.01); *H04L 65/61* (2022.05)

(58) Field of Classification Search
CPC ...... H04L 65/80; H04L 65/1069; H04L 65/61
USPC .................. 709/227, 228, 231, 217–219
See application file for complete search history.

(56) References Cited

U.S. PATENT DOCUMENTS

| | | | |
|---|---|---|---|
| 11,632,414 B2* | 4/2023 | Sodagar | H04L 65/612 709/231 |
| 11,956,281 B2* | 4/2024 | Sodagar | H04L 65/1069 |
| 12,238,353 B2* | 2/2025 | Stockhammer | H04N 21/26216 |
| 12,284,601 B2* | 4/2025 | Kolan | H04W 24/02 |
| 2020/0112753 A1 | 4/2020 | Stockhammer et al. | |

(Continued)

OTHER PUBLICATIONS

International Search Report issued Aug. 20, 2024 in International Application No. PCT/US2024/029366.

(Continued)

*Primary Examiner* — Kenneth R Coulter
(74) *Attorney, Agent, or Firm* — Sughrue Mion, PLLC (57) ABSTRACT

A method includes receiving, by a $5^{th}$ generation media streaming (5GMS) client for an uplink streaming session, a media entry point and one or more operation point parameters; determining, by the 5GMS client, a plurality of available service descriptions for the media entry point; transmitting, from the 5GMS client to a 5GMS application, the plurality of available service descriptions; receiving, by the 5GMS client from the 5GMS application, a selected service description from the plurality of available service descriptions; selecting, by the 5GMS client, a dynamic policy based on a plurality of Service Operation Point parameters associated with the selected service description; transmitting, by the 5GMS client to a 5GMS application function (AF), the dynamic policy and the plurality of Service Operation Point parameters associated with the selected service description; establishing, with the 5GMS AF, the uplink streaming session.

20 Claims, 5 Drawing Sheets

(56) References Cited

U.S. PATENT DOCUMENTS

| | | |
|---|---|---|
| 2023/0007573 A1 | 1/2023 | Kolan |
| 2023/0050764 A1 | 2/2023 | Stockhammer et al. |
| 2023/0362759 A1* | 11/2023 | Sodagar ............ H04W 36/0083 |
| 2024/0155429 A1* | 5/2024 | Sodagar ............ H04W 28/0858 |
| 2024/0155473 A1* | 5/2024 | Sodagar ................ H04W 48/17 |
| 2025/0063433 A1* | 2/2025 | Sodagar ................. H04L 67/55 |

OTHER PUBLICATIONS

Written Opinion issued Aug. 20, 2024 in International Application No. PCT/US2024/029366.

* cited by examiner

METHOD AND APPARATUS FOR DYNAMIC POLICY SELECTION FOR MEDIA UPLINK STREAMING IN 5G MEDIA STREAMING NETWORKS

CROSS-REFERENCE TO RELATED APPLICATION

This application claims priority from U.S. Provisional Application No. 63/466,615, filed on May 15, 2023, in the United States Patent and Trademark Office, the disclosure of which is incorporated herein by reference in its entirety.

FIELD

The disclosure generally relates to $5^{th}$ generation (5G) media streaming (5GMS), and, in particular, to a method for dynamic policy selection for media uplink streaming in 5GMS networks.

BACKGROUND

3GPP 26.501 defines a generic 5GMS media architecture. Such architecture defines how a client can use a streaming format to stream the content from the 5GMS Application provider through 5GMS architecture, for both downlink as well as uplink.

3GPP has defined the use of dynamic policies for downlink streaming. In particular, a recent work item addressed the use of service operation points for this application. However, it does not provide a solution for the use of service operation points in uplink streaming.

This architecture provides the entry point for that format through the service access information provided either through M8 or M5. The entry point is either a document or a pointer to a document that defines the streaming format. Recently, 3GPP considered supporting the use of dynamic policies based on service operation points for downlink streaming. However, the uplink streaming case is not addressed yet.

SUMMARY

According to one or more embodiments, a method comprises receiving, by a $5^{th}$ generation media streaming (5GMS) client for an uplink streaming session, a media entry point and one or more operation point parameters; determining, by the 5GMS client, a plurality of available service descriptions for the media entry point; transmitting, from the 5GMS client to a 5GMS application, the plurality of available service descriptions; receiving, by the 5GMS client from the 5GMS application, a selected service description from the plurality of available service descriptions; selecting, by the 5GMS client, a dynamic policy based on a plurality of Service Operation Point parameters associated with the selected service description; transmitting, by the 5GMS client to a 5GMS application function (AF), the dynamic policy and the plurality of Service Operation Point parameters associated with the selected service description; establishing, with the 5GMS AF, the uplink streaming session.

According to one or more embodiments, a user equipment (UE) comprises: at least one memory configured to store program code; and at least one processor configured to read the program code and operate as instructed by the program code, the program code including: first receiving code configured to cause the at least one processor to receive, by a $5^{th}$ generation media streaming (5GMS) client for an uplink streaming session, a media entry point and one or more operation point parameters; determining code configured to cause the at least one processor to determine, by the 5GMS client, a plurality of available service descriptions for the media entry point; first transmitting code configured to cause the at least one processor to transmit, from the 5GMS client to a 5GMS application, the plurality of available service descriptions; second receiving code configured to cause the at least one processor to receive, by the 5GMS client from the 5GMS application, a selected service description from the plurality of available service descriptions; selecting code configured to cause the at least one processor to select, by the 5GMS client, a dynamic policy based on a plurality of Service Operation Point parameters associated with the selected service description; second transmitting code configured to cause the at least one processor to transmit, by the 5GMS client to a 5GMS application function (AF), the dynamic policy and the plurality of Service Operation Point parameters associated with the selected service description; establishing code configured to cause the at least one processor to establish, with the 5GMS client, the uplink streaming session.

According to one or more embodiments, a non-transitory computer readable medium having instructions stored therein, which when executed by a processor cause the processor to execute a method comprising: receiving, by a $5^{th}$ generation media streaming (5GMS) client for an uplink streaming session, a media entry point and one or more operation point parameters; determining, by the 5GMS client, a plurality of available service descriptions for the media entry point; transmitting, from the 5GMS client to a 5GMS application, the plurality of available service descriptions; receiving, by the 5GMS client from the 5GMS application, a selected service description from the plurality of available service descriptions; selecting, by the 5GMS client, a dynamic policy based on a plurality of Service Operation Point parameters associated with the selected service description; transmitting, by the 5GMS client to a 5GMS application function (AF), the dynamic policy and the plurality of Service Operation Point parameters associated with the selected service description; and establishing, with the 5GMS AF, the uplink streaming session.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 1:
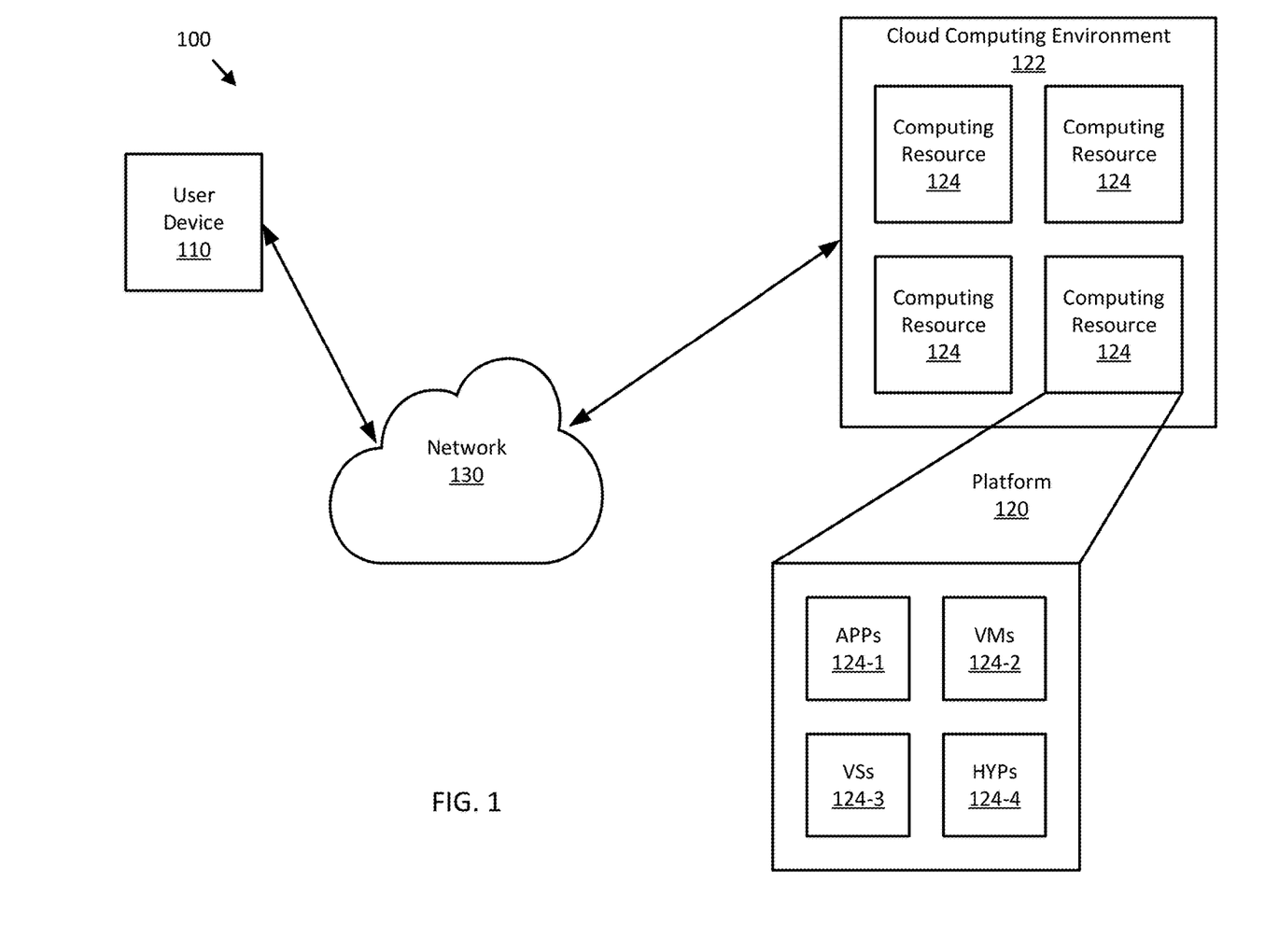
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSs) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
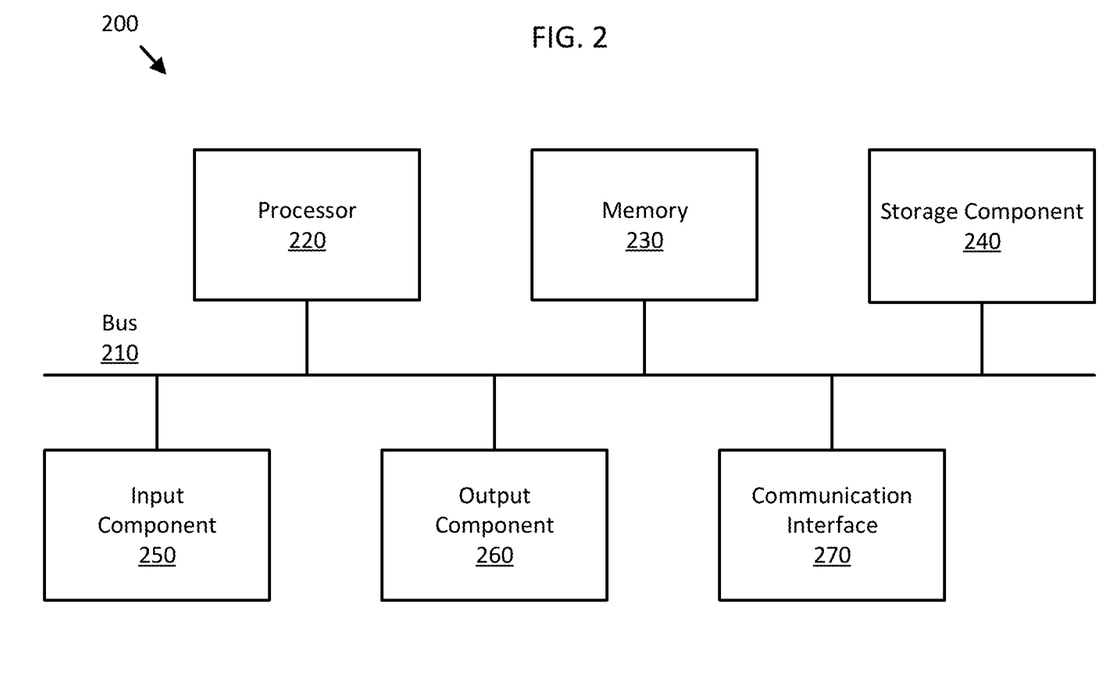
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (Mld) by a 5GMSd Application provider that configures the 5GMSd features relevant to a set of 5GMSd Aware Applications. A 5GMSd Media Player may refer to a UE function that enables playback and rendering of a media presentation based on a media play entry and exposing some basic controls such as play, pause, seek, and stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
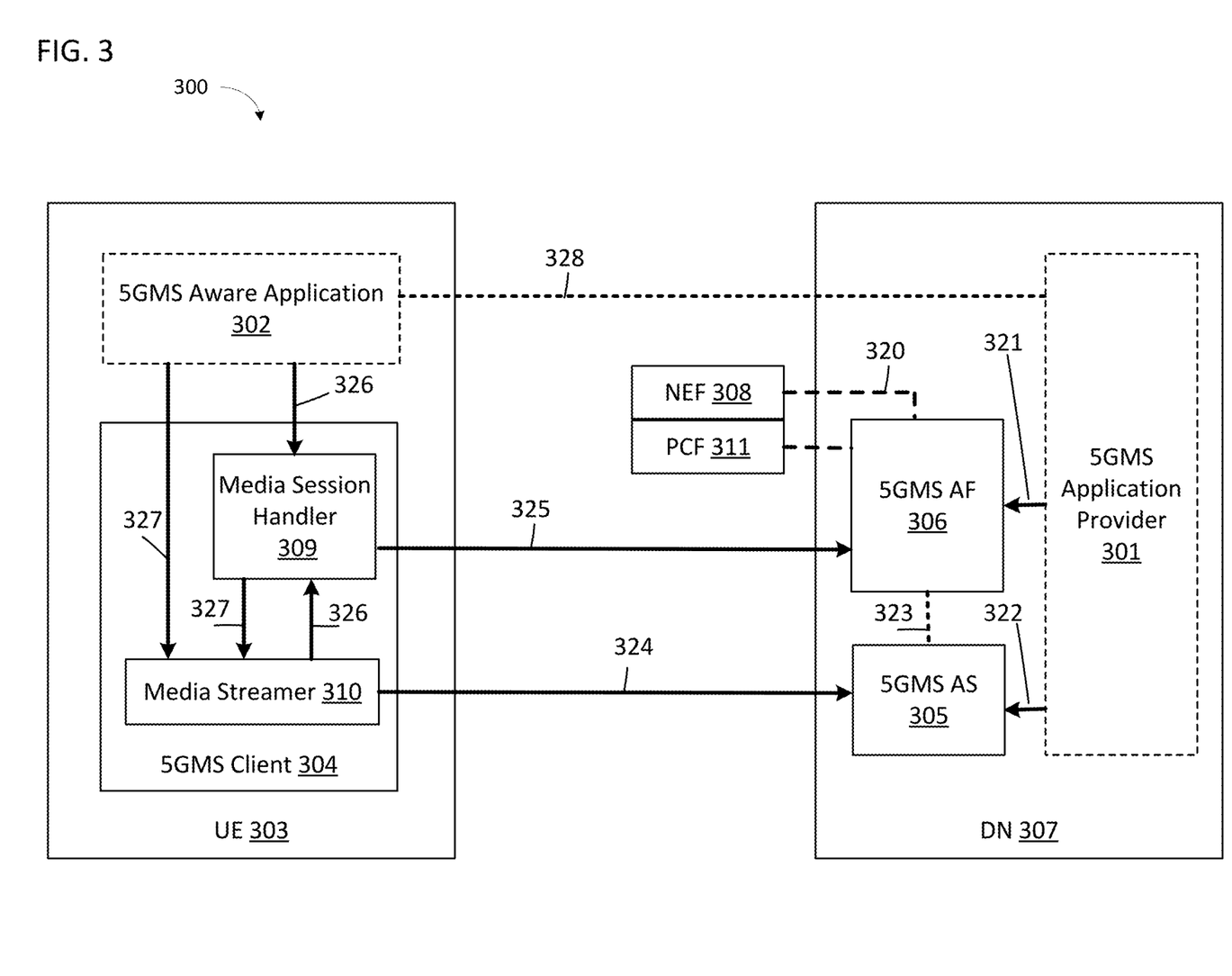
FIG. 3 is a diagram of a media architecture for media uplink streaming, according to embodiments.

FIG. 3 is a diagram of a media architecture 300 for media streaming according to embodiments. A 5GMS Application Provider 301 may use 5GMS for uplink streaming services. In one or more examples, a streaming service may be a live video streaming session using a social medial platform. The 5GMS Application Provider 301 may be implemented as a server. The 5GMS Application Provider 301 may provide a 5GMS Aware Application 302 on a UE 303 to make use of 5GMS Client 304 and network functions using interfaces and APIs defined in 5GMS. A 5GMS application server (AS) 305 may be an AS dedicated to 5G Media Uplink Streaming. The 5GMS Client 304 may be an internal function of the UE 303 dedicated to 5G Media Streaming.

A 5GMS application function (AF) 306 and the 5GMS AS 305 may be Data Network (DN) 307 functions. The 5GMS AF 306 may be implemented as a server. Functions in trusted DNs may be trusted by the operator's network. Therefore, AFs in trusted DNs may directly communicate with some or all 5G Core functions. Functions in external DNs may only communicate with 5G Core functions via a network exposure function (NEF) 308 using link 320. The NEF 308 facilitates secure access to exposed network services and capabilities of the 5G network.

The media architecture 300 may connect UE 303 internal functions and related network functions for 5G Media Streaming. Accordingly, the media architecture 300 may include a number of functions. For example, the 5GMS Client 304 on UE 303 may be an originator of a 5GMS service that may be accessed through interfaces/APIs. The 5GMS Client 304 may include two sub-functions, a Media Session Handler 309 and a Media Streamer 310. The Media Session Handler 309 may communicate with the 5GMS AF 306 in order to establish, control and support the delivery of a media session. The Media Session Handler 309 may expose APIs that may be used by the 5GMS Aware Application 302. The Media Streamer 310 may communicate with 5GMS AS 305 to stream the media content and provide a service to the 5GMS Aware Application 302 for media capturing and streaming, and the Media Session Handler 309 for media session control. The 5GMS Aware Application 302 may control the 5GMS Client 304 by implementing external application or content service provider specific logic and enabling the establishment of a media session. The 5GMS AS 305 may host 5G media functions and may be implemented as a content delivery network (CDN), for example. The 5GMS Application Provider 301 may be an external application or content specific media functionality (e.g., media storage, consumption, transcoding and redistribution) that uses 5GMS to stream media from the 5GMS Aware Application 302. The 5GMS AF 306 may provide various control functions to the Media Session Handler 309 on the UE 303 and/or to the 5GMS Application Provider 301. The 5GMS AF 306 may relay or initiate a request for a different policy control function (PCF) 311 treatment or interact with other network functions.

The media architecture 300 may include a number of different interfaces. For example, link 321 may relate to M1, which may be a 5GMS Provisioning API exposed by 5GMS AF 306 to provision usage of media architecture 300 and to obtain feedback. Link 322 may relate to M2, which may be a 5GMS Publish API exposed by 5GMS AS 305 and used when the 5GMS AS 305 in a trusted DN, such as DN 307, is selected to receive content for streaming service. Link 323 may relate to M3, which may be an internal API used to exchange information for content hosting on 5GMS AS 305 within a trusted DN such as DN 307. Link 324 may relate to M4, which may be a Media Streaming API exposed by the 5GMS AS 305 to the Media Streamer 310 to stream media content. Link 325 may relate to M5, which may be a Media Session Handling API exposed by 5GMS AF 305 to Media Session Handler for media session handling, control, and assistance that also include appropriate security mechanisms (e.g., authorization and authentication). Link 326 may relate to M6, which may be a UE 303 Media Session Handling API exposed by Media Session Handler 309 to 5GMS Aware Application 302 to make use of 5GMS functions. Link 327 may relate to M7, which may be a UE Media Streamer API exposed by Media Streamer 310 to the 5GMS Aware Application 302 and the Media Session Handler 309 to make use of the Media Streamer 310. Link 328 may relate to M8, which may be an Application API which is used for information exchange between 5GMS Aware Application 302 and 5GMS Application Provider 301, for example to provide service access information to the 5GMS Aware Application 302. The UE 303 may also be implemented in a self-contained manner such that interfaces M6 326 and M7 327 are not exposed.

The architecture illustrated in FIG. 3 defines how a client can use a streaming format to stream the content from the 5GMS Application provider through the 5GMS architecture. This architecture provides the entry point for that format through the service access information provided either through M8 or M5. The entry point is either a document or a pointer to a document that defines the streaming format. Recently, 3GPP considered adding multiple entry points for the same service using one or more formats. In this case, the service operation information includes the information regarding these entry points. The client chooses a format and uses the corresponding entry point to start streaming the content.

Embodiments of the present disclosure are direct to dynamic policy selection for media streaming in 5G networks.

According to one or more embodiments, service operation points are added to the streaming access parameters of uplink streaming, as illustrated in Table 1.

TABLE 1

| Parameters | Description |
|---|---|
| Media entry points | A set of entry points. Each entry point consists of one of the following:<br>a. An URL endpoint on the 5GMSu AS to which media can be streamed directly at M4u and its associated data, or<br>b. The URL of a document that can be downloaded from the 5GMSu AS which contains the parameters for uplink media streaming at M4u. |
| Service Operation Points | Sets of media streaming parameters, such as bit rate and target latency, each set being associated with a provisioned Policy Template and with a Service Description in a Media Player Entry document. |

This addition allows one or more media streaming parameters to be provided as part of Services Access Information to the client, therefore enabling the clients to associate a Media entry point's Service Description with a provisioned Policy Template.

Figure 4:
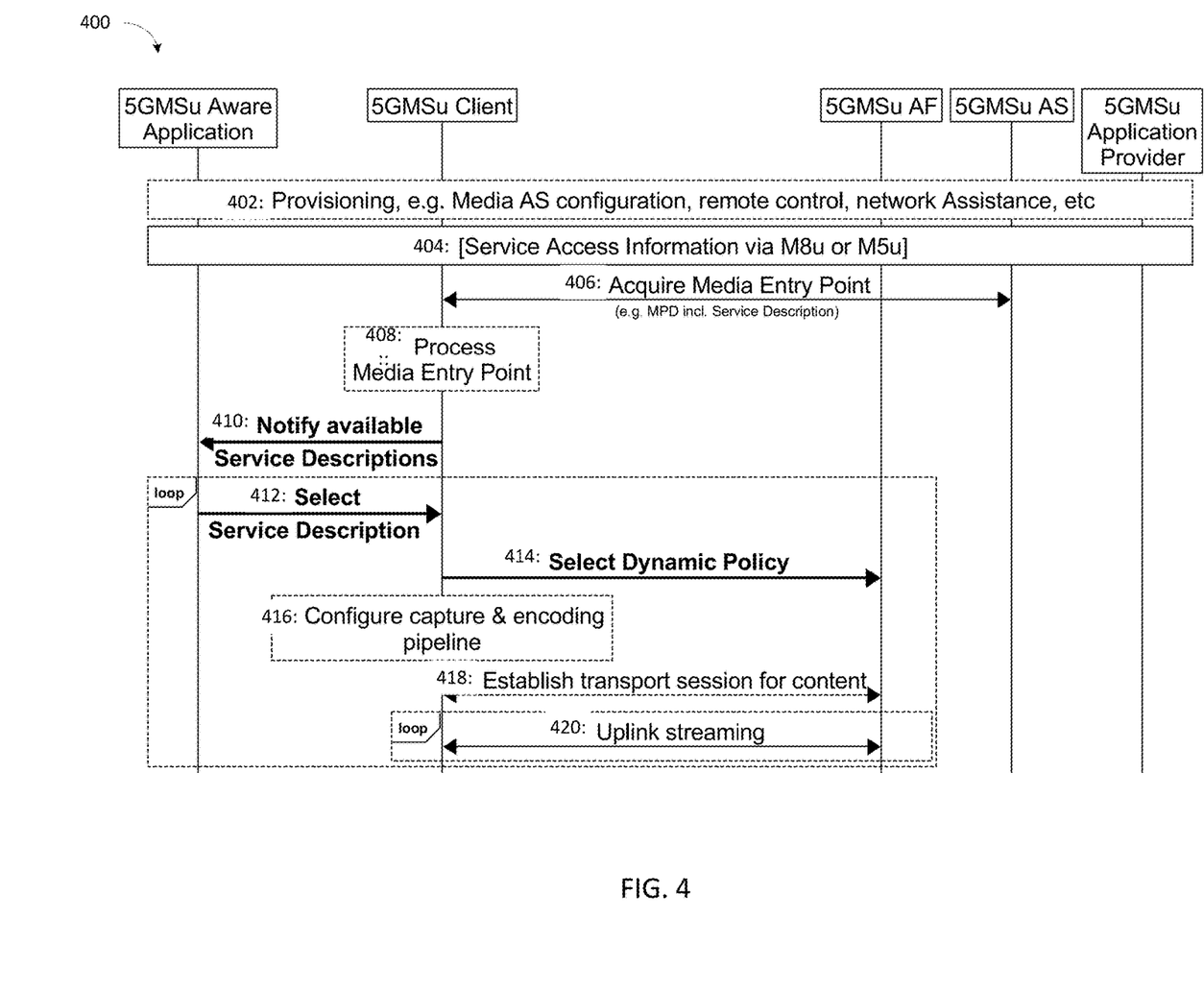
FIG. 4 is a call flow for uplink for operation point handling, according to embodiments.

FIG. 4 illustrates an example call flow 400 for the usage of Service Descriptions and Service Operation Points in uplink 5G Media Streaming services, according to one or more embodiments. In one or more examples, the 5GMSu Aware Application corresponds to the 5GMS Aware Application 302, the 5GMSu Client corresponds to the 5GMS Client 304, the 5GMSu AF corresponds to the 5GMS AF 306, the 5GMSu AS corresponds to the, and the 5GMSu Application Provider corresponds to the 5GMS Application Provider 301.

In operation 402, Policy Templates are provisioned in the 5GMSu AF and various configurations are performed.

In operation 404, the 5GMSu Aware Application obtain the service access information via M8u through the 5GMSu Application Provider or via M5u through the 5GMSu Client and 5GMSu AF. Table 2 illustrates example parameters of the service access information:

TABLE 2

| Parameters | Description |
|---|---|
| Provisioning Session identifier | Unique identification of the M1u Provisioning Session. |

In operation 406, the 5GMSu Client acquires the Media Entry Point from the 5GMSu AS.

In operation 408, the 5GMSu Client processes the Media Entry Point and finds the available Service Descriptions.

In operation 410, the 5GMSu Client notifies the 5GMSu Application about the available Service Descriptions.

In operation 412, the 5GMSu Application selects a Service Description and notifies the 5GMSu Client.

In operation 414, the 5GMSu client selects a Dynamic Policy based on the Service Operation Point parameters that are associated with the Service Description, using an identifier to correlate the two. Table 3 illustrates example parameters of dynamic policy invocation configuration.

TABLE 3

| Parameters | Description |
| --- | --- |
| Server address | A list of 5GMSu AF addresses (in the form of opaque URLs) which offer the APIs for dynamic policy invocation sent by the 5GMS Media Session Handler. |
| Valid Policy Template IDs | A list of Policy Template identifiers which the 5GMSu Client is authorized to use. |
| Service Data Flow Methods | A list of recommended Service Data Flow description methods (descriptors), e.g. 5-Tuple, ToS, 2-Tuple, etc, which should be used by the Media Session Handler to describe the Service Data Flows for the traffic to be policed. |
| External reference | Additional identifier for this Policy Template, unique within the scope of its Provisioning Session, that can be cross-referenced with external metadata about the streaming session. |

In operation 416, the 5GMSu configures its capture and encoding according to the selected Service Description.

In operation 418, the transport session is established for uplink streaming.

In operation 420, the media is streamed uplink.

As shown in this call flow, the provided service operation points in service access information enable the 5GMSu client to associate the selected service description in the chosen media entry point with the dynamic policy template that has the corresponding service operation points and then request that dynamic policy template from 5GMS AF.

Table 4 illustrates example parameters when the 5GMSu AF-based Network Assistance is activated for an uplink streaming session.

TABLE 4

| Parameters | Description |
| --- | --- |
| Server address | 5GMSu AF address that offers the APIs for 5GMSu AF-based Network Assistance, accessed by the 5GMSu Media Session Handler. The server address shall be an opaque URL, following the 5GMS URL format. |

Figure 5:
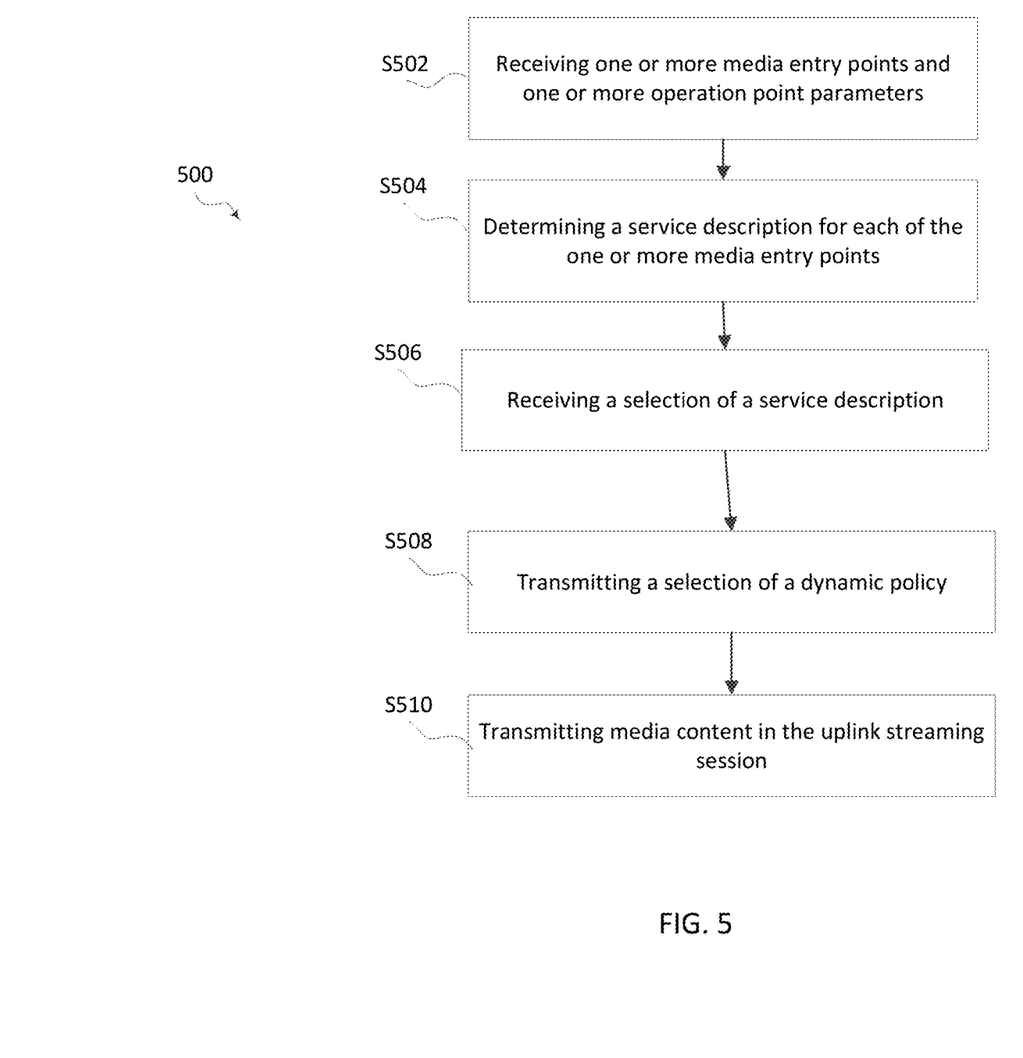
FIG. 5 is a flowchart of an example process for uplink for operation point handling.

FIG. 5 is a flowchart of an example process 500 of operation point handling for an uplink media steaming session.

The process may start at operation S502 where one or more media entry points and one or more operation point parameters are received. In one or more examples, the one or more operation point parameters may be received as service access information via the M8u interface through the 5GMS Application Provider or via the M5u interface through the 5GMS AF.

The process proceeds to operation S504 where a service description for each of the one or more media entry points is determined. For example, the determining of the service descriptions may be performed in accordance with operation 408.

The process proceeds to operation S506 were a selection of a service description is received. For example, in operation 410, the 5GMsu Client transmits available service descriptions to the 5GMSu Aware Application. In response, in operation 412, the 5GMsu Client receives a selected service description. The selected service description may be associated with at least one operation point parameter from the one or more received operation point parameters.

The process proceeds to operation S508 where a selection of a dynamic policy is transmitted. For example, in operation 414, the 5GMSu Client may identify a dynamic policy based on the selected service description and the at least one operation point parameter associated with the selected service description. The dynamic policy may be transmitted to the 5GMSu AF, and in response, the 5GMSu Client may receive a dynamic policy template for configuring the uplink media session.

In operation S510, the process transmits media content in the uplink media streaming session. For example, after the dynamic policy template is received and the uplink media streaming session is configured based on the dynamic policy template, the 5GMSu client may start transmitting content to the 5GSMu AF.

The proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
receiving, by a $5^{th}$ generation media streaming (5GMS) client for an uplink streaming session, a media entry point and one or more operation point parameters;

determining, by the 5GMS client, a plurality of available service descriptions for the media entry point;

transmitting, from the 5GMS client to a 5GMS application, the plurality of available service descriptions;

receiving, by the 5GMS client from the 5GMS application, a selected service description from the plurality of available service descriptions;

selecting, by the 5GMS client, a dynamic policy based on a plurality of Service Operation Point parameters associated with the selected service description;

transmitting, by the 5GMS client to a 5GMS application function (AF), the dynamic policy and the plurality of Service Operation Point parameters associated with the selected service description; and establishing, with the 5GMS AF, the uplink streaming session.

2. The method according to claim 1, further comprising: receiving, by the 5GMS client from the 5GMS AF, a dynamic policy template having a service description corresponding to the selected service and a Service Operation Point parameter corresponding to at least one Service Operation Point parameter from the plurality of Service Operation Point parameters.

3. The method according to claim 2, further comprising: configuring the uplink streaming session based on the received dynamic policy template.

4. The method according to claim 2, wherein the selection of the dynamic policy is associated with a template identifier that identifies the dynamic policy template.

5. The method according to claim 1, wherein the one or more operation point parameters are received as part of service access information from an application provider over a M8 interface.

6. The method according to claim 1, wherein the one or more operation point parameters are received as part of service access information from a 5GMS application server (AS) over a M5 interface.

7. The method according to claim 1, wherein the media entry point is an endpoint of a 5GMS application server (AS).

8. The method according to claim 1, wherein the media entry point is a link to a document downloaded from a 5GMS application server (AS) that contains one or more parameters for the uplink media streaming session.

9. The method according to claim 1, wherein the plurality of Service Operation Point parameters specify a bit rate for the uplink media streaming session.

10. The method according to claim 1, wherein the plurality of Service Operation Point parameters specify a target latency for the uplink media streaming session.

11. A user equipment (UE) comprising:
at least one memory configured to store program code; and
at least one processor configured to read the program code and operate as instructed by the program code, the program code including:
first receiving code configured to cause the at least one processor to receive, by a $5^{th}$ generation media streaming (5GMS) client for an uplink streaming session, a media entry point and one or more operation point parameters;
determining code configured to cause the at least one processor to determine, by the 5GMS client, a plurality of available service descriptions for the media entry point;
first transmitting code configured to cause the at least one processor to transmit, from the 5GMS client to a 5GMS application, the plurality of available service descriptions;
second receiving code configured to cause the at least one processor to receive, by the 5GMS client from the 5GMS application, a selected service description from the plurality of available service descriptions;
selecting code configured to cause the at least one processor to select, by the 5GMS client, a dynamic policy based on a plurality of Service Operation Point parameters associated with the selected service description;
second transmitting code configured to cause the at least one processor to transmit, by the 5GMS client to a 5GMS application function (AF), the dynamic policy and the plurality of Service Operation Point parameters associated with the selected service description; and
establishing code configured to cause the at least one processor to establish, with the 5GMS client, the uplink streaming session.

12. The UE according to claim 11, wherein the program code further comprises:
third receiving code configured to cause the at least one processor to receive, by the 5GMS client from the 5GMS AF, a dynamic policy template having a service description corresponding to the selected service and a Service Operation Point parameter corresponding to at least one Service Operation Point parameter from the plurality of Service Operation Point parameters.

13. The UE according to claim 12, wherein the program code further comprises:
configuring code configured to cause the at least one processor to configure the uplink streaming session based on the received dynamic policy template.

14. The UE according to claim 12, wherein the selection of the dynamic policy is associated with a template identifier that identifies the dynamic policy template.

15. The UE according to claim 11, wherein the one or more operation point parameters are received as part of service access information from an application provider over a M8 interface.

16. The UE according to claim 11, wherein the one or more operation point parameters are received as part of service access information from a 5GMS application server (AS) over a M5 interface.

17. The UE according to claim 11, wherein the media entry point is an endpoint of a 5GMS application server (AS).

18. The UE according to claim 11, wherein the media entry point is a link to a document downloaded from a 5GMS application server (AS) that contains one or more parameters for the uplink media streaming session.

19. The UE according to claim 11, wherein the plurality of available Service Operation Point parameters specify a bit rate for the uplink media streaming session.

20. A non-transitory computer readable medium having instructions stored therein, which when executed by a processor cause the processor to execute a method comprising:
receiving, by a $5^{th}$ generation media streaming (5GMS) client for an uplink streaming session, a media entry point and one or more operation point parameters;
determining, by the 5GMS client, a plurality of available service descriptions for the media entry point;
transmitting, from the 5GMS client to a 5GMS application, the plurality of available service descriptions;

receiving, by the 5GMS client from the 5GMS application, a selected service description from the plurality of available service descriptions;
selecting, by the 5GMS client, a dynamic policy based on a plurality of Service Operation Point parameters associated with the selected service description;
transmitting, by the 5GMS client to a 5GMS application function (AF), the dynamic policy and the plurality of Service Operation Point parameters associated with the selected service description; and
establishing, with the 5GMS AF, the uplink streaming session.

* * * * *